US006378770B1

(12) United States Patent
Clark et al.

(10) Patent No.: US 6,378,770 B1
(45) Date of Patent: *Apr. 30, 2002

(54) AUTOMATED TELLER MACHINES AND METHOD OF REPLENISHING THE SAME

(75) Inventors: Barrie Clark; Robert D. Andrew, both of Dundee (GB)

(73) Assignee: NCR Corporation, Dayton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,125

(22) Filed: Apr. 20, 1998

(30) Foreign Application Priority Data

May 30, 1997 (GB) ............................................ 9711069

(51) Int. Cl.$^{7}$ ................................................ G06F 17/60
(52) U.S. Cl. ....................................... 235/379; 235/486
(58) Field of Search ................................ 235/379, 385, 235/486; 705/1, 35; 902/12, 13, 30

(56) References Cited

U.S. PATENT DOCUMENTS 4,337,393 A * 6/1982 Hilton ........................ 235/487
4,370,006 A * 1/1983 Graef et al. .............. 902/13 X
4,524,268 A * 6/1985 Fukatsu ...................... 235/379
4,662,621 A * 5/1987 Lundblad .................. 902/13 X
4,795,889 A * 1/1989 Matuura et al. ............ 235/379
4,980,543 A * 12/1990 Hara et al. .................. 235/379
5,051,900 A * 9/1991 Ito et al. ..................... 364/408
5,076,441 A * 12/1991 Gerlier ................... 235/379 X
5,105,364 A * 4/1992 Kawamura et al. ......... 364/478
5,135,212 A * 8/1992 Utsumi et al. .............. 235/379
5,313,050 A * 5/1994 Hiroki et al. ............... 235/379
5,593,149 A * 1/1997 Kimura et al. ............. 271/3.01
5,804,804 A * 9/1998 Fukatsu et al. ............. 235/379
5,900,607 A * 5/1999 Awatsu et al. .............. 235/379
6,014,649 A * 1/2000 Kobayashi et al. ........... 705/43

FOREIGN PATENT DOCUMENTS

EP 0845764 6/1998
EP 0881605 * 12/1998 ........... G07D/11/00
GB 0 845 764 A1 * 3/1998 ........... G07D/11/00

* cited by examiner

*Primary Examiner*—Karl D. Frech
*Assistant Examiner*—Daniel St. Cyr
(74) *Attorney, Agent, or Firm*—Gregory A. Welte

(57) ABSTRACT

In an ATM, bank notes remaining within currency cassettes 40 of the cash dispenser 18 are transferred to an auxiliary storage device 54 before the cassettes 40 are removed from the ATM and replaced by full cassettes during a replenishment sequence, so as to avoid handling of non-empty cassettes and to improve the efficiency of the replenishment procedure. The transfer of notes may take place during the actual replenishment sequence, the cassettes 40 containing the highest denomination bank notes and those containing the least number of notes having precedence. Alternatively, the transfer of notes may occur automatically during normal operation of the ATM, when the number of notes within a cassette 40 reaches a predetermined level. In subsequent cash withdrawal transactions, the notes stored in the auxiliary storage device 54 are dispensed to customers in preference to the note stored in the currency cassettes

12 Claims, 5 Drawing Sheets

AUTOMATED TELLER MACHINES AND METHOD OF REPLENISHING THE SAME

BACKGROUND OF THE INVENTION

This invention relates to automated teller machines (ATMs).

In conventional ATMs, stacks of currency notes are stored in one or more currency cassettes and on receipt of a valid cash withdrawal request from a customer, notes are extracted from the cassettes and transported to a cash dispenser slot in a user console. An ATM is generally capable of dispensing notes of at least two different denominations and separate cassettes are normally provided for notes of each particular denomination.

It is desirable that a low level indication is provided when the number of currency notes remaining within a particular cassette in the ATM reaches a predetermined critical level, which may not be sufficient to guarantee that a typical customer cash withdrawal request can be successfully fulfilled using the notes remaining in that particular cassette. Such an indication is typically provided by a sensor comprising a permanent magnet associated with a pusher assembly which is arranged to urge notes towards an exit end of the cassette from which they are extracted. When the pusher assembly reaches a position in the proximity of the exit end, a reed switch mounted within the ATM is activated by the permanent magnet to indicate that the number of notes within the cassette has reached a predetermined low level. The reed switch is commonly positioned so that a low level indication will be given when approximately 75 to 100 notes remain within the cassette.

In some ATMs, dispensing of notes from a particular cassette is suspended immediately a low level condition is detected, so as eliminate the risk of 'short-dispenses' and so as to minimize the waiting time of a customer who requests an amount of currency which exceeds that contained within the cassette. However in more sophisticated ATM's, the management software used to control the ATM is capable of determining the residual content of a cassette at any time, on the basis of the number of notes extracted therefrom in previous cash withdrawal transactions. In such ATM's, dispensing from a cassette may continue after a low level indication has been given for that cassette, if a controller unit of the ATM deems that at least some of the notes required for a particular transaction remain in the cassette.

During a replenishment operation, empty or 'low level' cassettes are removed from the ATM by an operator and may be refilled on location. However, for security reasons, such cassettes are more commonly replaced by prepared full cassettes and are returned to a financial institution, often at a location remote from the ATM, for replenishment. In fact, during some replenishment procedures, all the cassettes in the ATM are systematically replaced by full cassettes, irrespective of their residual content, so as to maximize the efficiency of the operation. Hence, cassettes containing substantial amounts of money as well as those in a 'low-level' condition are frequently removed from an ATM during a replenishment procedure. The return of such nonempty cassettes to a financial institution is inefficient, costly and time-consuming, as the cassettes must be emptied and their contents checked before replenishment takes place.

The handling of non-empty currency cassettes is also undesirable due to the security risks involved, including the risk that the cassettes may be tampered with before replenishment takes place. Such fraud may be difficult to detect since accurate checking of residual notes in a cassette can be difficult where the management software used in an ATM is incapable of providing a running indication of the residual contents of cassettes.

SUMMARY OF THE INVENTION

It is an object of the present invention to provide an ATM in which the above mentioned difficulties are alleviated.

According to a first aspect of the present invention, there is provided a method of replenishing an automated teller machine (ATM) in which currency notes are stored in at least one main storage device, characterized by the steps of extracting the residual contents of a main storage device and transferring the extracted contents to an auxiliary storage device, and replacing the empty main storage device with a replenished main storage cassette.

According to another aspect of the present invention, there is provided an ATM comprising at least one main storage device for storing currency notes and detecting means for detecting the level of residual notes in a main storage device, characterized by at least one auxiliary storage device for receiving and storing currency notes, and transfer means adapted to transfer the contents of a main storage device to an auxiliary storage device in accordance with the detected level of residual notes in the main storage device.

Such an auxiliary storage device may be arranged to dispense notes when they are requested, in preference to the main storage device.

It should be understood that a plurality of auxiliary storage devices may be provided, holding banknotes of different denominations to each other.

BRIEF DESCRIPTION OF THE DRAWINGS

One embodiment of the invention will now be described by way of example with reference to the accompanying drawings, in which.

DETAILED DESCRIPTION

Figure 1:
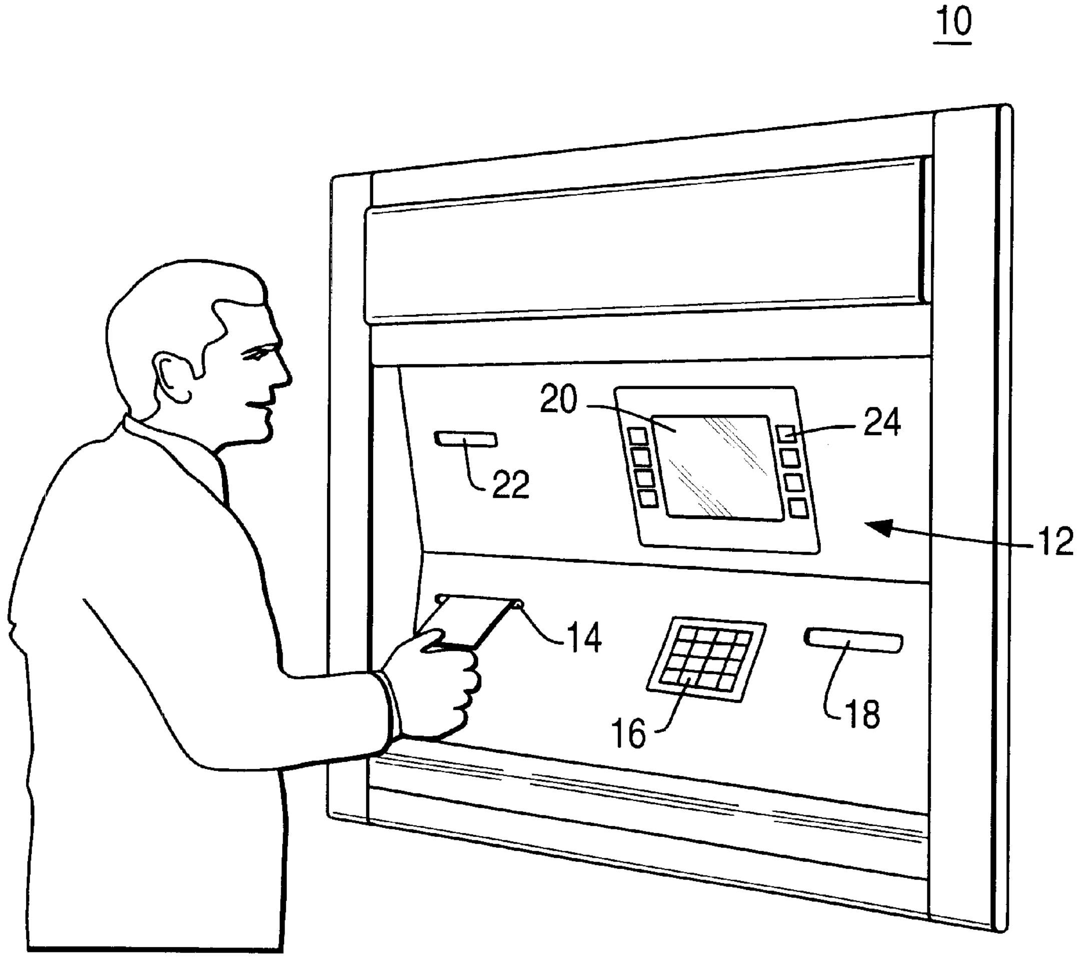
FIG. 1 is an external perspective view of an automated teller machine (ATM) embodying the invention.
Figure 2:
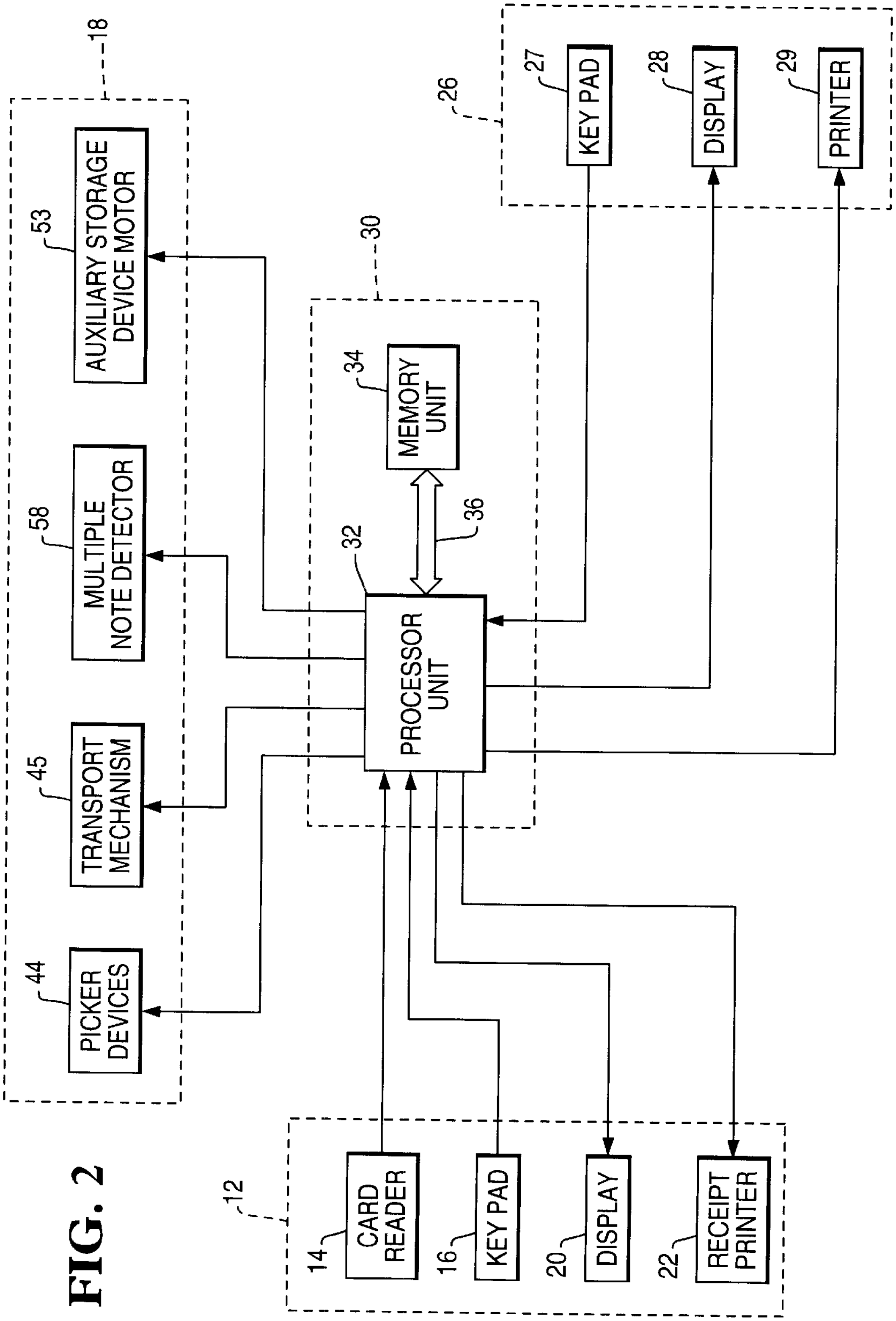
FIG. 2 is a block diagram representation of the ATM of FIG. 1.

Referring to FIGS. 1 and 2, the front of the ATM 10 shown therein is provided with a user panel 12 including a card reader slot 14 for insertion of a user's identification card, a key pad 16, a cash dispenser slot 18 through which bank notes are delivered to a user, a display screen 20 and a receipt printer slot 22 through which a receipt for a transaction is delivered to the user at the end of a transaction. The card reader, cash dispenser and receipt printer modules associated with the respective slots 14, 18 and 22 in the user panel 12 of the ATM 10, are designated by the same reference numerals in FIG. 2. In a typical ATM transaction, a user inserts his card into the card reader slot 14 and data encoded on the card is read. Instructions are then displayed on the screen 20. The user is requested to enter a personal identification number (PIN) on the key pad 16 which is verified, usually at a central location remote from the ATM 10. If the PIN is determined to be correct against information read from the inserted card, a menu of the various facilities available to the user is then displayed on the screen 20. If a cash withdrawal facility is selected, the user is requested to enter the sum required on the key pad 16 or by means of additional keys 24 provided at the side of the screen 20.

The ATM 10 further comprises a controller unit 30 which communicates with components of the user panel 12, with an operator panel 26 mounted inside the ATM and with various other operating mechanisms of the ATM 10. The operator panel 26 includes a key pad 27, a display screen 28 and a printer 29. The controller unit 30 includes a processor unit 32, and a memory unit 34 connected via a bus line 36 to the processor unit 32. The processor unit 32 receives input signals from the card reader 14, the user panel key pad 16 and the operator panel key pad 27, and provides output signals to various mechanisms of the cash dispenser 18, to the displays 20 and 28 of the user and operator panels 12 and 26, and to the user panel receipt printer 22 and the operator panel printer 29. It should be understood that the processor unit 32 controls the amount of cash dispensed by the cash dispenser 18, the information displayed on the displays 20 and 28 and the information printed by the printers 22 and 29.

Figure 3:
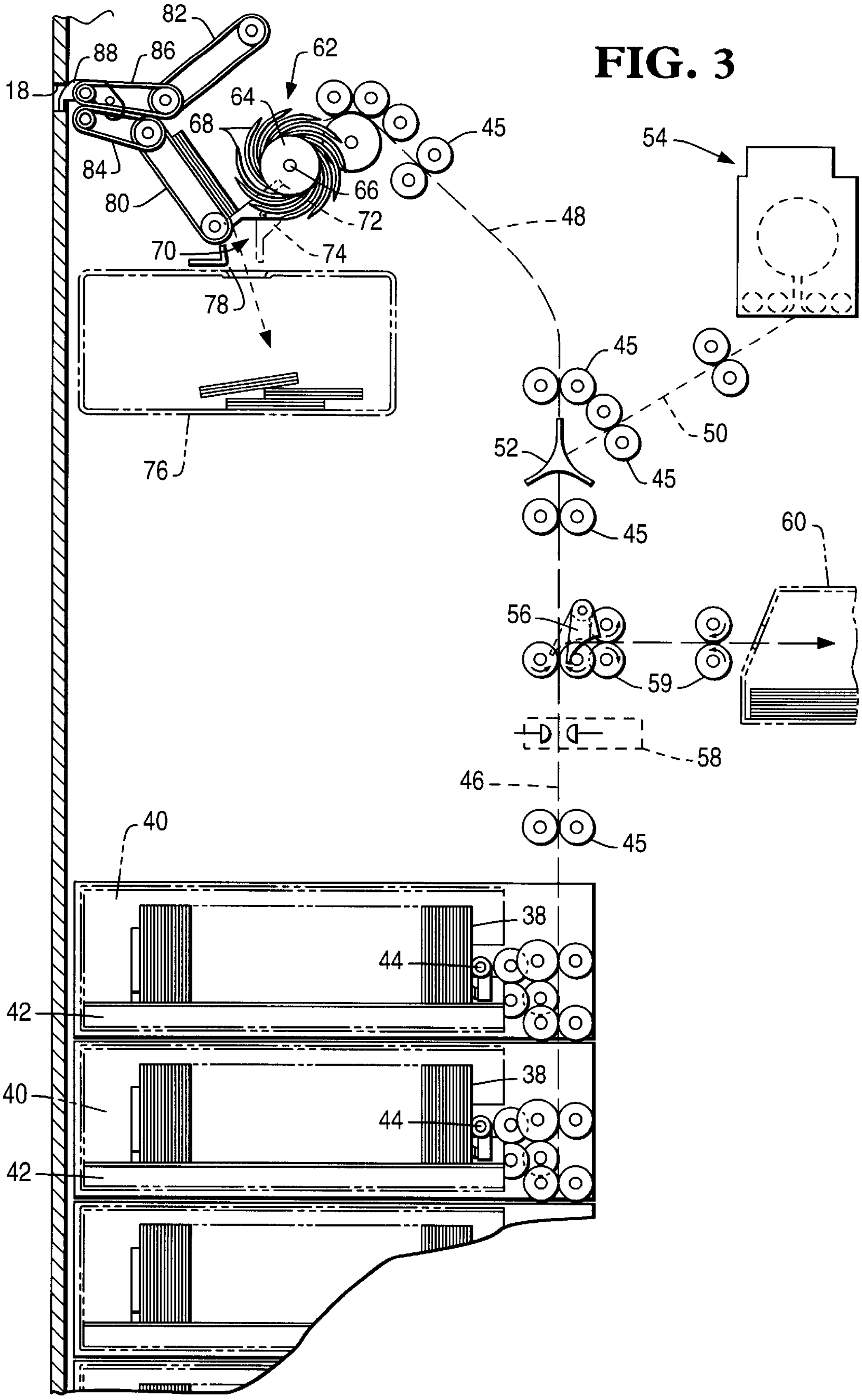
FIG. 3 is a diagrammatic representation of the main operating parts of a cash dispenser of the ATM of FIG. 1.

Referring now additionally to FIG. 3, the various mechanisms within the cash dispenser 18 controlled by the processor unit 32 include a multiple note detector 58 for detecting the presence of multiple superposed bank notes, vacuum operated picker devices 44 for picking notes from currency cassettes 40, a transport mechanism 45 for transporting notes picked from one or more of the cassettes 40, and a drive motor 53 of an auxiliary storage device 54. The processor unit 32 may include a microcomputer, and the memory unit 34 may be a non-volatile RAM. Suitable computers and memories are readily available in the marketplace. Their structure and operation are well known and therefore will not be described.

The main operating parts of the cash dispenser 18 embodying the invention will now be described with particular reference to FIG. 3. Stacks of bank notes 38 are held in the cassettes 40, the cassettes being slidably mounted in compartments 42 and each holding notes of different denominations. The picker devices 44 serve to extract notes from each cassette 40. The transport mechanism 45 is associated with three feed paths 46, 48 and 50 linked by a diverter 52 and serves to transfer notes from one location to another within the ATM 10. The diverter 52 is controlled by the controller unit 30 to pivot between different positions according to the selected path of transport of notes within the ATM.

The transport mechanism 45 transfers notes picked from the cassettes 40 along a first unidirectional feed path 46, either to a second unidirectional feed path 48 for delivery to a customer, or to a third bi-directional feed path 50 for delivery to the auxiliary storage device 54. A second diverter 56 is provided along the first feed path 46 to direct any mispicked notes which are detected by the multiple note detector 58 into a first reject bin 60.

A stacking wheel 62 and stripper plate assembly 70 are provided at the end of the second feed path 48, for stacking notes prior to being delivered to a customer through the cash dispenser slot 18 via a series of co-operating belts 80, 82, 84 and 86. The stacking wheel 62 comprises a plurality of stacking plates 64, spaced apart in parallel relationship along the shaft 66 of the stacking wheel 62, each stacker plate 64 incorporating a series of curved tines 68 which pass between fingers 72 of the stripper plate assembly 70 rockably mounted on a shaft 74. A further reject bin 76 is provided for notes which are retracted from the cash dispenser slot 18, in the event a customer omits to remove them therefrom at the end of a cash withdrawal transaction.

Figure 4:
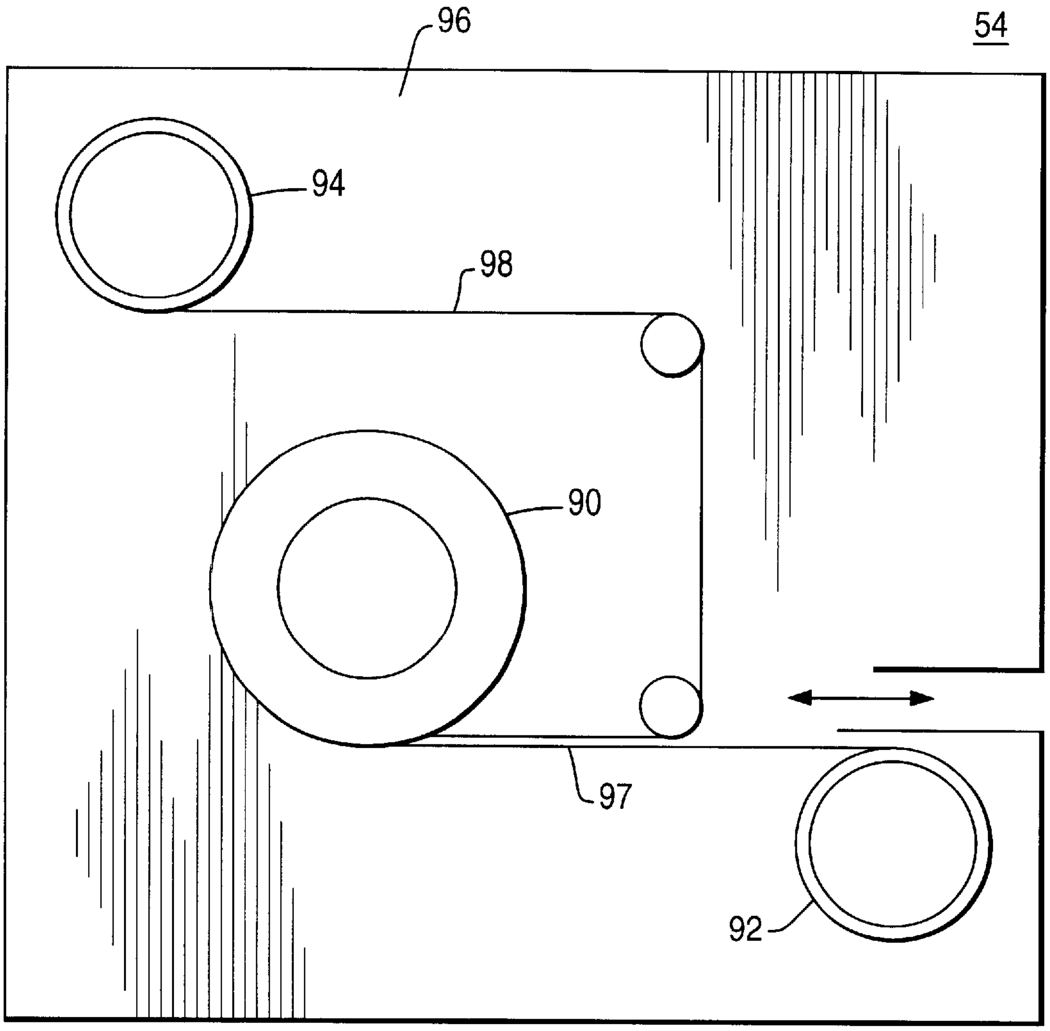
FIG. 4 is a diagrammatic view of an auxiliary storage device which may be used in the cash dispenser of FIG. 3.

The auxiliary storage device 54 is shown in more detail in FIG. 4, but it should be appreciated that the device may take a variety of other physical forms such as, for example, a storage stack. The auxiliary storage device of FIG. 4 is operated on a "last in first out" (LIFO) basis and is preferably chosen to have less inertia than the currency cassettes 40, so that it can dispense notes at a faster rate than dispensing from the currency cassettes 40. The auxiliary storage device 54 comprises a main storage drum 90, first and second tape feeder drum means 92 and 94 which are rotatably mounted within a housing 96. A first tape 97 is secured at one end to the main storage drum 90 and at its opposite end to the first feeder drum means 92, while a second tape 98 is secured at one end to main storage drum 90 and at its opposite end to the second feeder drum means 94, the tapes 97 and 98 being wound about the main drum 90 and their respective feeder drums means 92 and 94. It should be understood that each tape 97 and 98 could comprise two or more separate tapes spaced apart along the axis of the main storage drum, while each tape feeder drum means 92 and 94 could comprise two or more separate drums spaced apart along a common axis.

In a depositing mode, the main drum 90 is driven to rotate in a clockwise direction (with reference to FIG. 4) winding the tapes 97 and 98 and notes held therebetween, onto the main drum 90. Hence, the notes are securely held on the main drum 90 between wrappings of the tapes 97 and 98. In a dispensing mode, the feeder drum means 92 and 94 are driven to rotate in a clockwise direction, causing the tapes 97 and 98 to wind off the main drum 90 and the individual notes to be unloaded and fed out of the storage device 54.

Referring again to FIG. 3, the operation of the ATM embodying the present invention will now be described. On receipt of a valid customer cash withdrawal request, the requisite notes are picked from the cassettes 40 by the picker devices 44 and are fed by the transport mechanism 45 along the first unidirectional feed path 46, the direction of feed of the notes being perpendicular to their long dimensions. If the presence of multiple superposed notes is detected by the detector 58, the diverter 56 is controlled to pivot to a position in which passage of the notes along the first feed path 46 is blocked and the multiple note is directed via rolls 59 into a reject bin 60.

If single notes are detected, the notes proceed towards the diverter 52 which is controlled by the controller unit 30 to pivot so as to direct the notes from the first feed path 46 to the second unidirectional feed path 48. The notes are then fed towards the stacking wheel 62 to be loaded onto a stationary belt 80. Each note enters between adjacent tines 68 of the stacking plates 64 and is carried partly around the axis of the stacking wheel 62. The notes are stripped from the wheel 62 by the fingers 72 of the stripper plate 70, and are stacked against the belt 80 with a long edge of the note resting on the stripper plate assembly 70. The belt 80 co-operates with a pair of rockably mounted belts 82 (only one of which is shown) which are rocked in a clockwise direction so as to trap the stack of notes between the belts 80 and 82. The belts 80 and 82 are then operated to drive the stacked notes to another pair of belts 84 and 86, which are in turn driven to transport the stack of notes through a shutter 88 to a position where the stack of notes extends through the cash dispenser slot 18 in the user panel 12 of the ATM.

In the event that a customer fails to remove the notes which extend through the cash dispenser slot 18, the notes are retracted back through the shutter 88 on elapse of a predetermined period of time, to avoid the notes being picked up by someone else. The belts 84 and 86 are driven in the reverse direction to carry the retracted notes back onto the belt 80. The stripper plate assembly 70 is rocked into the position shown in chain outline in FIG. 3 and the belts 80 and 82 are operated to feed the stack in a direction opposite to the normal feed direction, the stack of retracted notes being deposited into the reject bin 76 via an opening 78 in the top thereof.

When notes are to be transferred from the cassettes 40 to the auxiliary storage device 54, the notes are extracted from the cassettes 40 by the picker devices 44 and are fed along the first unidirectional feed path 46 as described above. The diverter 52 is controlled to direct the picked notes from the first feed path 46 to the third bi-directional feed path 50. The notes are then fed to the auxiliary storage device 54 for storage. Any mispicked notes detected by the detector 58 are directed to the reject bin 60 in the manner described above. The denomination of the notes and the order in which they are transferred to the auxiliary storage device 54 is stored in the memory 34 of the ATM controller unit 30.

Notes stored in the auxiliary storage device 54 may be dispensed during subsequent customer transactions in preference to, or in addition to, notes from the currency cassettes 40.

If at least some of the required notes are available in the auxiliary storage device 54, they are dispensed therefrom on a "last in first out" basis (LIFO) and fed along the third bi-directional feed path 50 towards the diverter 52. The diverter 52 is controlled to direct notes from the third feed path 50 to the second feed path 48 for transport to the stacking wheel 62, prior to being delivered to the customer through the cash dispenser slot 18 in the user panel 12 of the ATM. This transfer operation is noticeably faster than the equivalent transfer operation from the currency cassettes 40 to the customer. If it is not possible to complete the customer request from the auxiliary storage device 54, but notes for the transaction are available from the currency cassettes 40, the balance of the request is obtained by extraction from the appropriate cassettes 40, in which case the notes are fed along the feed paths 46 and 48 for transport to the customer in the manner described above.

Figure 5:
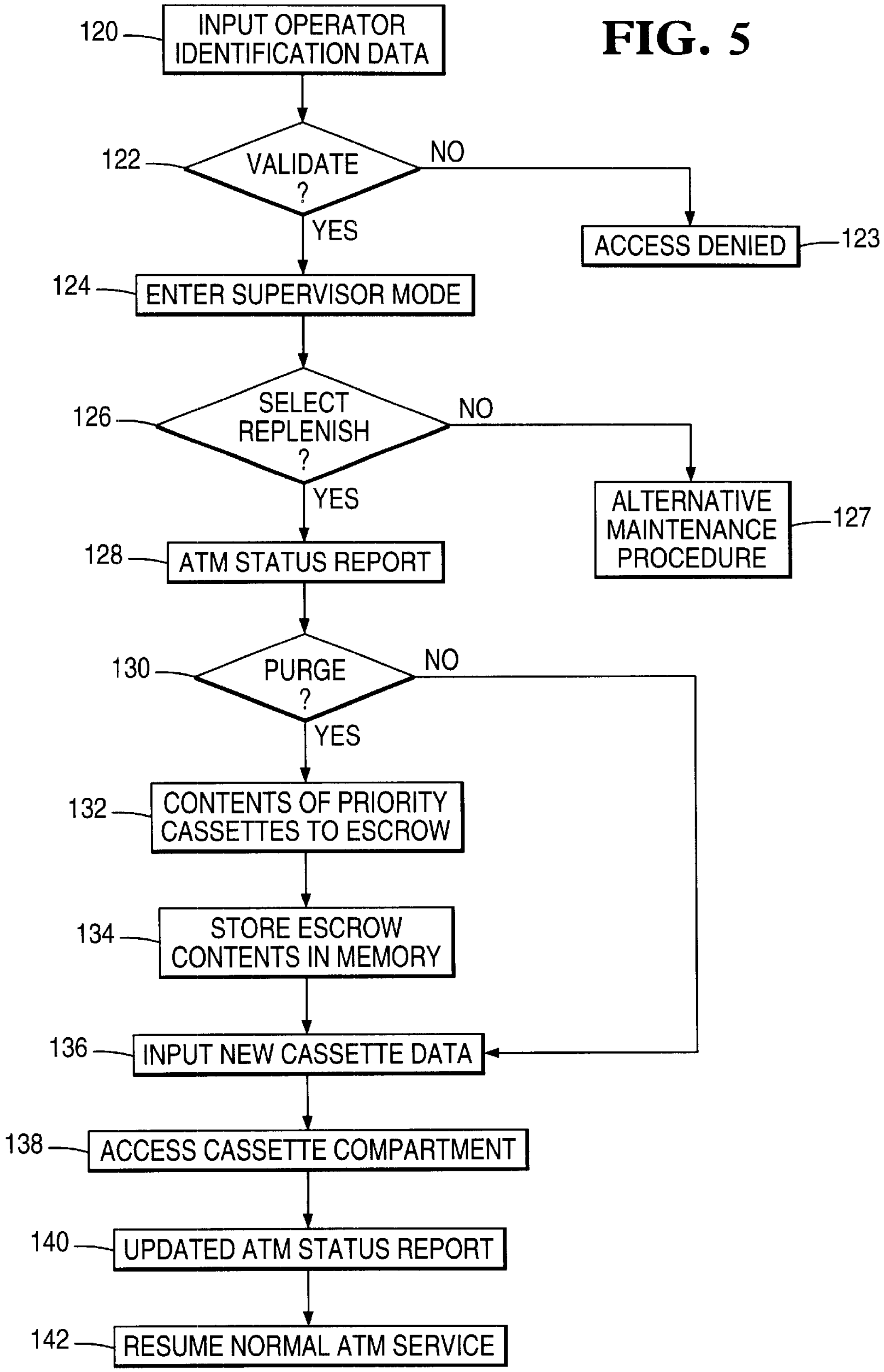
FIG. 5 is a flow diagram representing a replenishment operation of the cash dispenser of FIG. 3.

With reference FIGS. 2, 3 and the flow diagram of FIG. 5, a replenishment sequence of the cash dispenser 18 of the ATM 10 of FIG. 1 will be described. In the first step 120 of the sequence, an operator attending the ATM inputs identification data to the key pad 27 of the operator panel 26 within the ATM housing. This data is verified in step 122 by the processor 32 of the ATM controller unit 30 for security reasons. If the operator identification data is validated, the processor 32 causes the ATM 10 to enter a SUPERVISOR MODE (step 124), in which the ATM 10 is not available to customers for dispensing cash. If the operator identification data is not verified in step 122, then the operator is denied access (step 123) to the cash dispenser 18 and the SUPERVISOR MODE (step 124) is not entered. In the SUPERVISOR MODE, the operator is presented with a menu of the various maintenance procedure options, including a REPLENISH option, displayed on the display 28 of the operator panel 26. The operator selects the REPLENISH option (step 126).

In step 128, the ATM controller unit 30 sends an ATM STATUS REPORT to a host computer and a copy may be printed out for the operator by the operator panel printer 29. The report provides information about the current status of each currency cassette 40 within the ATM 10, including identification of empty cassettes and cassettes for which a low-level condition has been detected and information as to the current content of the auxiliary storage device 54 (ESCROW) and its residual storage capacity.

In step 130, the operator may select a PURGE option. The processor 32 of the ATM controller unit 30 determines the priority of cassettes 40 to be purged on the basis of their current content and on the residual capacity of the auxiliary storage device 54 and issues a PURGE command. Cassettes 40 containing higher denomination currency notes and those which contain the least number of notes are given priority. For example, if it is determined that the auxiliary storage device 54 has the capacity to accommodate the contents of a cassette 40 containing the highest denomination of banknotes dispensed by the ATM and which has not reached a low level condition, in addition to the contents of any cassettes 40 for which a low level has been detected, the highest denomination notes will also be transferred. This allows cassettes 40 which are approaching a low level condition also to be replenished during a replenishment sequence and so further improves the efficiency of a replenishment operation and maximizes the storage capacity of the ATM. If the auxiliary storage device 54 has sufficiently large storage capacity and is relatively empty at the time of replenishment, it may even be possible to transfer the contents of all the cassettes 40 to the auxiliary storage device 54.

In step 132, the PURGE command causes activation of the picker devices 44 to extract one by one the currency notes remaining in the cassettes 40 selected by the processor 32 and to transfer the notes to the auxiliary storage device 54 in the manner described above. A record of the notes transferred to the auxiliary storage device 54, including the denomination and order in which they are transferred, is stored in the memory 34 of the ATM controller unit 30 (step 134)

On completion of the PURGE sequence, the operator is requested to input data concerning the full cassettes 40 to be inserted in the ATM, including a cassette identification code and the amount and denomination of the currency notes contained in the cassette before access to the cassette compartments 42 of the ATM is allowed. This data is input by the operator via the key pad 27 of the operator panel 26 in step 136 and is stored in the memory 34 of the ATM 10. The balance of notes in each cassette 40 can therefore be updated during subsequent transactions involving dispensing of notes from that particular cassette 40. An updated ATM STATUS REPORT based on the input data is sent to the host computer in step 138.

If the PURGE option is not selected by the operator in step 130, no transfer of the cassette contents to the auxiliary storage device 54 takes place and the sequence moves forward to step 136, where the operator is requested to input data regarding the full cassettes 40 to be inserted in the ATM 10.

In step 140, the operator is allowed access to the cassette compartments 42 of the cash dispenser 18 in order to remove the empty cassettes and to replace them with full currency cassettes. When all the empty cassettes 40 have been replaced, the cassette compartments 42 are closed and the operator selects a RESUME NORMAL SERVICE option from the menu displayed on the display screen 28 of the operator panel 26 (step 142). The ATM 10 is then available for dispensing cash by customers. Hence, the security risks involved in handling non-empty cassettes are eliminated and, since the cassettes are returned to the financial institution in an empty condition, no time-consuming and costly checking of the residual contents is required before replenishment of the cassettes can take place.

In an alternative embodiment of the invention, the residual contents of the cassettes 40 are automatically emptied and transferred to the auxiliary storage device 54, immediately a low level condition for a particular cassette 40 is detected. Such a low level indication may be provided by known magnetic sensors mounted within each cassette 40 or by the controller unit 30 of the ATM, and will typically occur when approximately 75 to 100 notes remain in the cassette 40. However, the magnetic sensor may be arranged or the ATM controller unit 30 programmed to provide a low level indication when the balance of notes reaches any predetermined value.

It should also be appreciated that any convenient number of auxiliary storage devices 54 can be provided and may each be designated to hold a particular denomination of banknote likely to be in popular demand. In one particular embodiment of the invention, where more than one auxiliary storage device 54 is provided, a SUPERVISOR MODE is not entered by the ATM on validation of the operator identification data in step 124 of a replenishment sequence, but the ATM remains in normal service. The PURGE option is selected by the operator in step 130 and the contents of the cassettes to be purged are transferred according to their denominations to the particular auxiliary storage device 54 designated to hold notes of that denomination, in the manner described above. The replenishment sequence continues in the manner described above and the notes required for any customer transactions requested during the remainder of the replenishment sequence are dispensed from the appropriate one of the auxiliary storage device or devices 54. Hence, the ATM remains available for customer transactions throughout the replenishment sequence except for a short period when the transfer of notes from the cassettes to the auxiliary storage devices is occurring. This improves customer service by eliminating the inconvenience of an "out of service" ATM.

What is claimed is:

1. Method of replenishing currency at an ATM which contains cassettes from which currency is withdrawn and delivered to customers, comprising the following steps:

a) transferring all currency remaining within some cassettes into a storage device within the ATM, to thereby empty the cassettes;

b) removing the emptied cassettes from the ATM;

c) leaving the storage device within the ATM; and d) replacing the removed cassettes with replenished cassettes of currency.

2. Method according to claim 1, and further comprising the steps of e) after replenishment, extracting currency from both the storage device and the replenished cassettes, and delivering the extracted currency to customers.

3. Method according to claim 2, wherein the currency extracted from the storage device comprises currency which was transferred into the storage device in connection with replenishment.

4. Method of replenishing currency in an ATM, comprising the following steps:

a) at replenishment, causing a feed mechanism to transfer all currency notes from some money cassettes (40) within the ATM to a storage device (54) within the ATM, thereby emptying the money cassettes (40);

b) removing empty money cassettes (40) from the ATM;

c) leaving the storage device (54) within the ATM, together with currency deposited into the storage device in step (a); and d) replacing the empty cassettes (40) with replenished cassettes.

5. Method according to claim 4, and further comprising the step of:

e) taking currency from both replenished cassettes and the storage device (54), and delivering the currency to customers.

6. Method according to claim 4, and further comprising the step of:

e) delivering currency to customers from said storage device (54) after the replenishment.

7. Method according to claim 4, and further comprising the steps of e) maintaining a sensor within the ATM which i) continually examines the number of currency notes within a cassette and, ii) when the number falls below a threshold, produces a low-level indication; and f) when a low-level indication for a cassette is detected, transferring all currency notes from the cassette to an auxiliary storage device.

8. Method of replenishing currency in an ATM, comprising the following steps:

a) at replenishment, causing a feed mechanism to transfer all currency notes from some money cassettes (40) within the ATM to a storage device (54) within the ATM, thereby emptying the money cassettes (40);

b) removing empty money cassettes (40) from the ATM;

c) leaving the storage device (54) within the ATM, together with currency deposited into the storage device in step (a);

d) replacing the empty cassettes (40) with replenished cassettes;

e) causing the feed mechanism to place currency notes between a pair of belts (97, 98) within the storage device (54), when the feed mechanism delivers the currency notes to the storage device (54); and f) winding the belts (97, 98) around a drum (90), thereby storing the currency notes on the drum (90).

9. Method according to claim 8, wherein the currency taken from said storage device (54) is taken by unwinding said belts (97, 98) from said drum (90), and withdrawing the currency from the belts (97, 98).

10. A system, comprising:

a) an ATM, which contains money cassettes (40) within a locked compartment (42) which become depleted as the ATM dispenses currency to customers;

b) within the ATM, i) means for receiving a PURGE command and, in response, causing a feed mechanism to transfer all currency from at least some money cassettes (40) within the ATM to a storage device (54) within the ATM, thereby emptying at least some money cassettes (40); and ii) means for A) receiving codes from an operator and B) opening the compartment (42) if the codes meet predetermined criteria.

11. System according to claim 10, wherein the codes match codes contained on replacement cassettes of currency, which are effective to replenish the cassettes (40) within the compartment (42).

12. In an ATM which contains cassettes which store currency, a method of replenishing currency in the cassettes, comprising the following steps:

a) receiving data from a service technician, and verifying the identity of the technician;

b) entering a supervisory mode, wherein the ATM is disabled from dispensing currency to customers;

c) after entering supervisory mode, transmitting an ATM status report to a host computer, which report
   i) identifies empty cassettes,
   ii) identifies cassettes for which a low-level condition has been detected, and
   iii) indicates present currency content of an Auxiliary Storage Device, ASD;

d) after entering supervisory mode, receiving a purge signal from the technician and, in response
   i) ascertaining remaining capacity of the ASD;
   ii) ascertaining a target cassette having the smallest number of pieces of currency;
   iii) transferring all pieces of currency from the target cassette to the ASD; and
   iv) repeating steps (d)(i), (d)(ii) and (d)(iii) until the remaining capacity of the ASD will not allow further cassettes to be emptied into the ASD; and e) after responding to the purge signal, replacing empty cassettes, including cassettes emptied in response to the purge signal, with cassettes stocked with currency.

* * * * *